United States Patent
Honeyman et al.

(10) Patent No.: US 12,297,622 B2
(45) Date of Patent: *May 13, 2025

(54) REMOTE FEATURE ACTIVATION IN POWER MACHINES

(71) Applicant: Doosan Bobcat North America, Inc., West Fargo, ND (US)

(72) Inventors: Joel Honeyman, Horace, ND (US); Matt Sagaser, Bismarck, ND (US); Dennis Agnew, Moffit, ND (US); Justin Odegaard, West Fargo, ND (US); Spencer Mindeman, West Fargo, ND (US); Dana Nelson, Dilworth, MN (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/903,832

(22) Filed: Oct. 1, 2024

(65) Prior Publication Data
US 2025/0019934 A1    Jan. 16, 2025

Related U.S. Application Data

(63) Continuation of application No. 18/489,178, filed on Oct. 18, 2023, which is a continuation of application
(Continued)

(51) Int. Cl.
*E02F 9/20* (2006.01)
*G05B 19/042* (2006.01)
(Continued)

(52) U.S. Cl.
CPC .......... *E02F 9/2058* (2013.01); *E02F 9/2025* (2013.01); *G05B 19/042* (2013.01);
(Continued)

(58) Field of Classification Search
CPC ..... E02F 9/2058; E02F 9/2025; E02F 9/2296; G05B 19/042; H04L 67/125; H04L 67/141
See application file for complete search history.

(56) References Cited

U.S. PATENT DOCUMENTS

| | | | |
|---|---|---|---|
| 6,438,468 B1 | 8/2002 | Muxlow et al. | |
| 8,839,451 B1 | 9/2014 | Lam et al. | |
| (Continued) | | | |

FOREIGN PATENT DOCUMENTS

| | | |
|---|---|---|
| CA | 3109208 | 2/2020 |
| CN | 1716333 | 1/2006 |
| (Continued) | | |

OTHER PUBLICATIONS

International Preliminary Report on Patentability in International Appln. No. PCT/US2019/046716, mailed Feb. 25, 2021, 9 pages.
(Continued)

*Primary Examiner* — Tan Q Nguyen
(74) *Attorney, Agent, or Firm* — Fish & Richardson P.C.

(57) ABSTRACT

Implementations of the present disclosure are generally directed to activating features in power machines. More particularly, implementations of the present disclosure are directed to remote activation of features in power machines. Implementations include, methods, systems, and apparatus, including computer programs encoded on a computer storage medium, for transmitting a request for an initialization indicator for a software package from an initialization system of a power machine comprising hardware physically capable of executing at least one function, the request being transmitted, by a communication link of the initialization system, from a machine controller of the initialization system to a remote system, communicating, by the communication link, the initialization indicator from the remote system to the machine controller, and in response to receiv-
(Continued)

ing the initialization indicator: storing, by the machine controller, the initialization indicator, and executing, by the machine controller, the software package to control the at least one function.

20 Claims, 6 Drawing Sheets

Related U.S. Application Data

No. 18/158,703, filed on Jan. 24, 2023, now Pat. No. 11,821,174, which is a continuation of application No. 16/541,965, filed on Aug. 15, 2019, now Pat. No. 11,560,691.

(60) Provisional application No. 62/764,731, filed on Aug. 15, 2018.

(51) Int. Cl.
  *H04L 67/125* (2022.01)
  *H04L 67/141* (2022.01)
  *E02F 9/22* (2006.01)
  *G05B 19/04* (2006.01)

(52) U.S. Cl.
  CPC .......... *H04L 67/125* (2013.01); *H04L 67/141* (2013.01); *E02F 9/2296* (2013.01); *G05B 2219/2641* (2013.01)

(56) References Cited

U.S. PATENT DOCUMENTS

| | | | |
|---|---|---|---|
| 10,494,790 B2 | 12/2019 | Duppong et al. | |
| 11,560,691 B2 | 1/2023 | Honeyman et al. | |
| 11,821,174 B2 | 11/2023 | Honeyman et al. | |
| 2005/0256614 A1 | 11/2005 | Habermas | |
| 2010/0036696 A1 | 2/2010 | Lang et al. | |
| 2012/0041638 A1 | 2/2012 | Johnson et al. | |
| 2012/0047499 A1 | 2/2012 | Krzystofczyk et al. | |
| 2014/0033693 A1* | 2/2014 | Nelson ................ E02F 9/2285 60/416 |
| 2014/0075567 A1 | 3/2014 | Raleigh et al. | |
| 2014/0278036 A1 | 9/2014 | Ince et al. | |
| 2015/0339114 A1 | 11/2015 | Rockwell et al. | |
| 2016/0026182 A1 | 1/2016 | Boroditsky et al. | |
| 2016/0319517 A1* | 11/2016 | Nackers ............... E02F 9/2095 |
| 2019/0323525 A1* | 10/2019 | Juricak ................. F15B 11/17 |
| 2020/0056347 A1 | 2/2020 | Honeyman et al. | |
| 2023/0235534 A1 | 7/2023 | Honeyman et al. | |

FOREIGN PATENT DOCUMENTS

| | | |
|---|---|---|
| CN | 105234941 | 1/2016 |
| CN | 112534402 | 3/2021 |
| CN | 106462428 | 4/2021 |
| DE | 10044917 | 3/2002 |
| DE | 102008008108 | 8/2009 |
| EP | 3137994 | 3/2017 |
| EP | 3837598 | 6/2021 |
| WO | WO 2009009719 | 1/2009 |
| WO | WO 2016176547 | 11/2016 |

OTHER PUBLICATIONS

International Search Report and Written Opinion in International Appln. No. PCT/US2019/046716, mail Nov. 21, 2019, 14 pages.

* cited by examiner

REMOTE FEATURE ACTIVATION IN POWER MACHINES

CROSS-REFERENCE TO RELATED APPLICATIONS

This application is a continuation of U.S. patent application Ser. No. 18/489,178, entitled "Remote Feature Activation In Power Machines," filed Oct. 18, 2023, which is a continuation of U.S. patent application Ser. No. 18/158,703, entitled "Remote Feature Activation In Power Machines," filed Jan. 24, 2023, now U.S. Pat. No. 11,821,174, which is a continuation of U.S. patent application Ser. No. 16/541,965, entitled "Remote Feature Activation In Power Machines," filed Aug. 15, 2019, now U.S. Pat. No. 11,560,691, which claims the benefit under 35 U.S.C. § 119(e) of U.S. Patent Application No. 62/764,731, entitled "Remote Feature Activation In Power Machines," filed Aug. 15, 2018, which are incorporated herein by reference in their entirety.

BACKGROUND

This disclosure is directed toward power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples. Some such power machines can include one or more optional functions. In some examples, a function can include a physical activity that the power machine requires one or more hardware components, and a software package to perform.

The discussion above is merely provided for general background information and is not intended to be used as an aid in determining the scope of the claimed subject matter.

SUMMARY

Implementations of the present disclosure are generally directed to activating features in power machines. More particularly, implementations of the present disclosure are directed to remote activation of features in power machines.

In some implementations, a power machine includes hardware physically capable of executing at least one function, and a machine controller absent an initialized software package to enable execution of the at least one function, the machine controller receiving instructions to perform operations that can include initializing the software package, and selectively enabling execution of the at least one function by executing instructions of the software package. Other implementations of this aspect include corresponding systems, apparatus, and computer programs, configured to perform the actions of the methods, encoded on computer storage devices.

In another general aspect, innovative features of the subject matter described in this specification can be embodied in methods that include actions of transmitting a request for an initialization indicator for a software package from an initialization system of a power machine comprising hardware physically capable of executing at least one function, the request being transmitted, by a communication link of the initialization system, from a machine controller of the initialization system to a remote system. The actions include communicating, by the communication link, the initialization indicator from the remote system to the machine controller, and in response to receiving the initialization indicator: storing, by the machine controller, the initialization indicator, and executing, by the machine controller, the software package to control the at least one function. Other implementations of this aspect include corresponding systems, apparatus, and computer programs, configured to perform the actions of the methods, encoded on computer storage devices.

These and other implementations can each optionally include one or more of the following features. In some implementations, the request comprises one or more of an identifier of the power machine, an identifier of the software package, and one or more credentials of a user. In some implementations, the actions include subsequently disabling the software package. In some implementations, disabling the software package is executed in response to one of expiration of a period of time and a user request. In some implementations, the initialization indicator includes the period of time. In some implementations, the software package is executed in response to determining that the power machine includes the hardware. In some implementations, the hardware comprises at least one of ride control hardware and a variable displacement hydraulic motor. In some implementations, the actions include upon receiving the initialization indicator, enabling the machine controller to execute software previously loaded onto the machine controller.

Another general aspect can be embodied in an initialization system for power machine having hardware physically capable of executing at least one function. The initialization system includes a machine controller and a communication link. The machine controller has a non-volatile memory storing a software package with instructions that, when executed, can control the at least one function. The communication link is external to the machine controller and capable of establishing communication between the machine controller and a remote system, the communication link communicating a request for an initialization indicator from the machine controller to the remote system and communicating the initialization indicator from the remote system to the machine controller. The remote system provides the initialization indicator to the machine controller via the communication link and stores information related to provision of the initialization indicator to the machine controller, and when the machine controller receives and stores the initialization indicator, the machine controller is enabled to execute instructions of the software package to control the at least one function.

These and other implementations can each optionally include one or more of the following features. In some implementations, the request includes one or more of an identifier of the power machine, an identifier of the software package, and one or more credentials of a user. In some implementations, the machine controller subsequently disables the software package. In some implementations, disabling the software package is executed in response to one of expiration of a period of time and a user request. In some implementations, the initialization indicator includes the period of time. In some implementations, the software package is executed in response to determining that the power machine includes the hardware. In some implementations, the hardware comprises at least one of ride control hardware and a variable displacement hydraulic motor. In some implementations, at least a portion of the communication link is removably attached to the power machine. In some implementations, the communication link includes a controller in wireless communication with the portion of the communication link that is removably attached to the power machine. In some implementations, the communication link is fixed to the power machine. In some implementations, upon receiving the initialization indicator, the machine controller is enabled to execute software previously loaded onto the machine controller.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DETAILED DESCRIPTION

The concepts disclosed in this discussion are described and illustrated by referring to example implementations. These concepts, however, are not limited in their application to the details of construction and the arrangement of components in the illustrative implementations, and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Implementations of the present disclosure are generally directed to activating features in power machines. More particularly, implementations of the present disclosure are directed to remote activation of features in power machines. As described in further detail herein, a power machine in accordance with implementations of the present disclosure can include hardware physically capable of executing at least one function, and a machine controller absent an initialized software package to enable execution of the at least one function, the machine controller receiving instructions to perform operations that can include initializing the software package, and selectively enabling execution of the at least one function by executing instructions of the software package.

Figure 2:
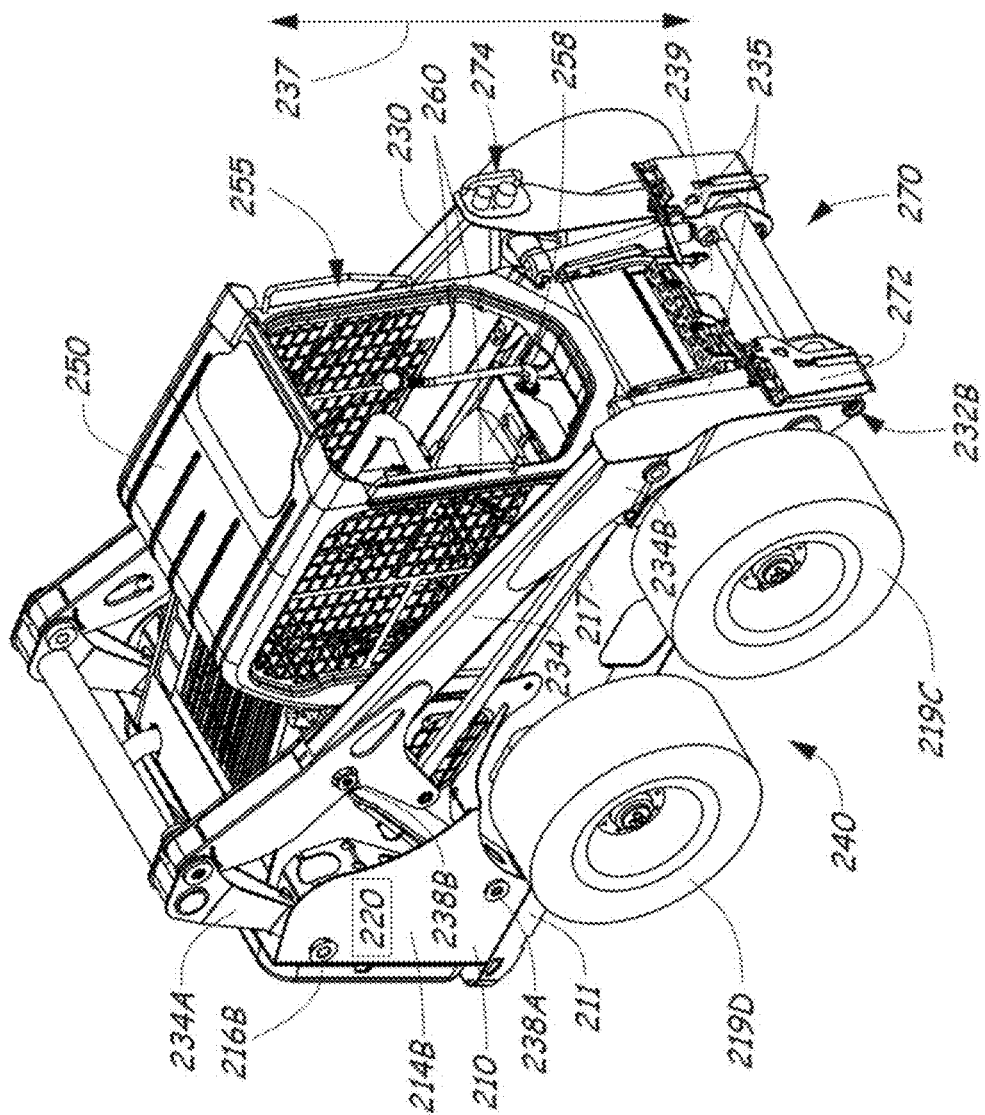
FIGS. 2-3 illustrate perspective views of a representative power machine in the form of a skid-steer loader of the type on which the disclosed embodiments can be practiced.
Figure 3:
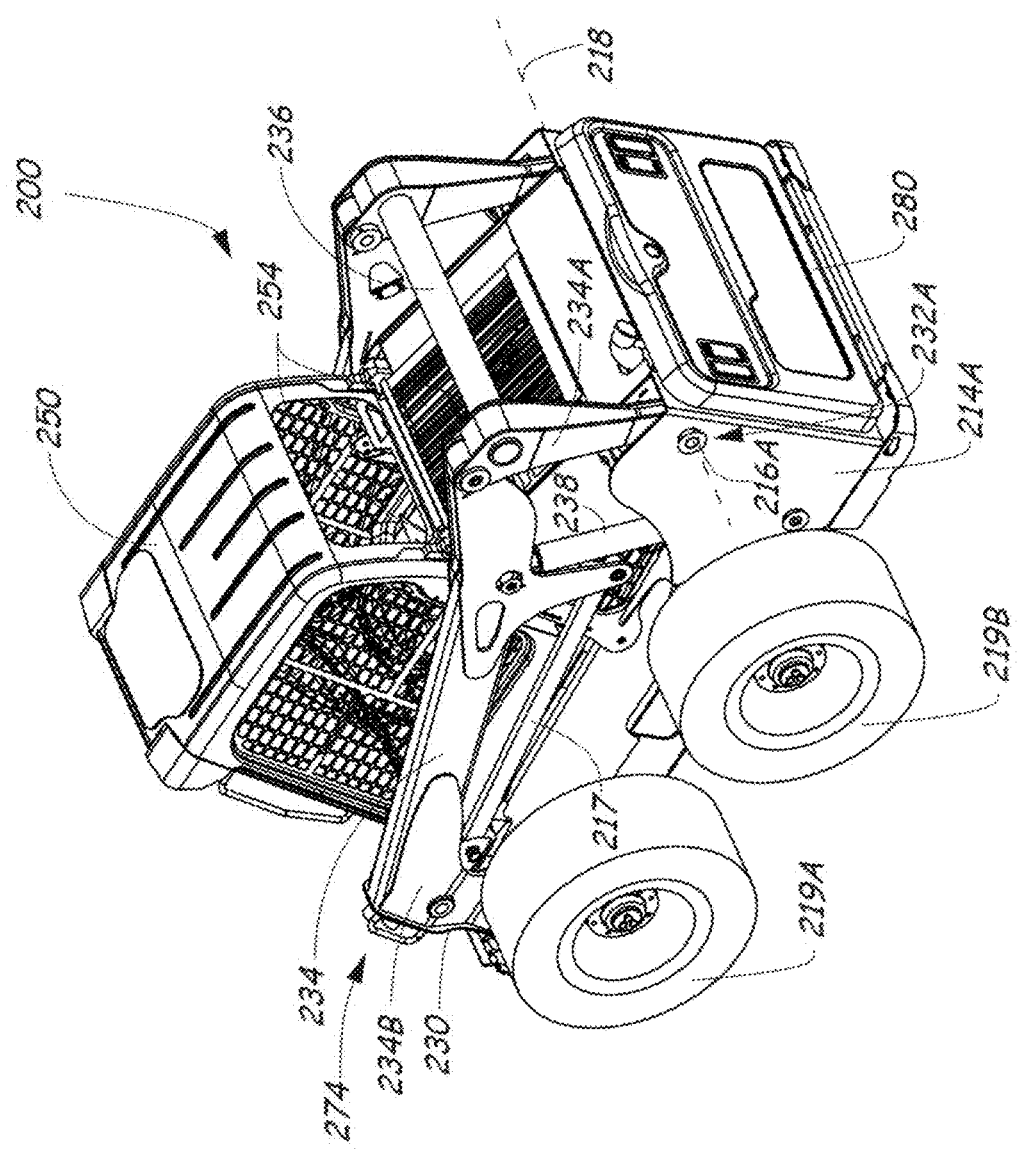

These concepts can be practiced on various power machines, as will be described below. A representative power machine on which implementations of the present disclosure can be practiced is illustrated in diagram form in FIG. 1, and a non-limiting example of such a power machine is illustrated in FIGS. 2-3, and described below before detailed description of implementations of the present disclosure. For the sake of brevity, only one power machine is illustrated and discussed as being a representative power machine. However, it is contemplated that implementations of the present disclosure can be realized on any appropriate power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
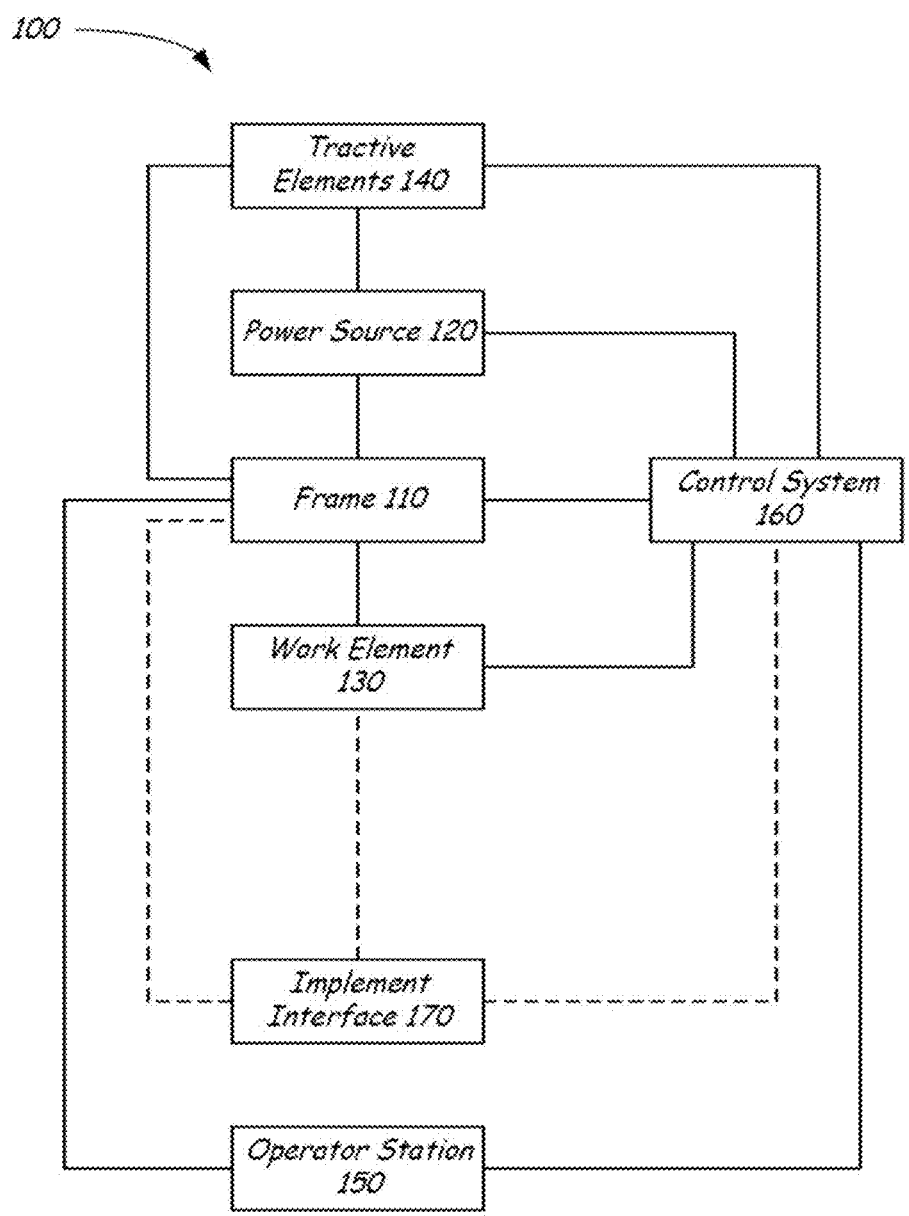
FIG. 1 is a block diagram illustrating functional systems of a representative power machine on which embodiments of the present disclosure can be advantageously practiced.

FIG. 1 is a block diagram that illustrates a power machine 100, which is representative of any of a number of different types of power machines, upon which the implementations of the present disclosure can be advantageously incorporated. The block diagram of FIG. 1 identifies various systems on the power machine 100, and the relationship between various components and systems. In some examples, power machines can include a frame, a power source, and a work element. The power machine 100 has a frame 110, a power source 120, and a work element 130. Because the power machine 100 shown in FIG. 1 is a self-propelled work vehicle, it also has tractive elements 140, which are themselves work elements provided to move the power machine 100 over a support surface. In some examples, the power machine 100 also includes an operator station 150 that provides an operating position for controlling the work elements of the power machine 100. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. An implement interface 170 can be provided, and can include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

The frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

The frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and/or implement interfaces 170. In some examples, power from the power source 120 can be provided to a control system 160, which in turn selectively provides power to the elements that are capable of using it to perform a work function. Power sources for power machines typically include an engine, such as an internal combustion engine, and a power conversion system, such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130, because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

In some examples, the operator station 150 includes an operating position, from which an operator can control operation of the power machine. In some power machines, the operator station 150 is defined by an enclosed or partially enclosed cab. Some power machines on which the disclosed implementations may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines, such as the power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1, in which implementations of the present disclosure can be advantageously employed. The loader 200 is a skid-steer loader, which is a loader that has tractive elements (in this case, four wheels) that are mounted to the frame of the loader by rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

The loader 200 is one particular example of the power machine 100 illustrated broadly in FIG. 1 and discussed above. To that end, features of loader 200 described herein include reference numbers that are generally similar to those used in FIG. 1. For example, the loader 200 is described as having a frame 210, just as the power machine 100 has a frame 110. The loader 200 is described herein to provide a reference for understanding one environment, on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, implementations of the present disclosure can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

The loader 200 includes the frame 210 that supports a power system 220, the power system being capable of generating or otherwise providing power for operating various functions on the power machine. The power system 220 is shown in block diagram form, but is located within the frame 210. The frame 210 also supports a work element in the form of a lift arm assembly 230 that is powered by the power system 220 and that can perform various work tasks. As the loader 200 is a work vehicle, the frame 210 also supports a traction system 240, which is also powered by power system 220, and can propel the power machine over a support surface. The lift arm assembly 230 in turn supports an implement interface 270, which includes an implement carrier 272 that can receive and secure various implements to the loader 200 for performing various work tasks. Power couplers 274 are provided, to which an implement can be coupled for selectively providing power to an implement that might be connected to the loader. Power couplers 274 can provide sources of hydraulic or electric power or both. The loader 200 includes a cab 250 that defines an operator station 255, from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled by operator input devices on the power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like, and/or by verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the implementations discussed below can have various different frame components that support various work elements. The elements of the frame 210 discussed herein are provided for illustrative purposes and the frame 210 is not the only type of frame that a power machine on which the implementations of the present disclosure can be practiced. The frame 210 of the loader 200 includes an undercarriage or lower portion 211 of the frame, and a mainframe or upper portion 212 of the frame that is supported by the undercarriage. In some examples, the mainframe 212 of the loader 200 is attached to the undercarriage 211, such as with fasteners or by welding the undercarriage to the mainframe. Alternatively, the mainframe 212 and undercarriage 211 can be integrally formed. The mainframe 212 includes a pair of upright portions 214A and 214B located on either side and toward the rear of the mainframe that support lift arm assembly 230, and to which the lift arm assembly 230 is pivotally attached. The lift arm assembly 230 is illustratively pinned to each of the upright portions 214A and 214B. The combination of mounting features on the upright portions 214A and 214B and the lift arm assembly 230, and mounting hardware (including pins used to pin the lift arm assembly to the mainframe 212) are collectively referred to as joints 216A and 216B (one is located on each of the upright portions 214) for the purposes of this discussion. The joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. The frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which implementations of the present disclosure can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which, on the loader 200, are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. The implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement-like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. In some examples, the implement power source 274 also includes electrical conduits that are in communication with a data bus on the excavator 200 to enable communication between a controller on an implement and electronic devices on the loader 200.

Figure 4:
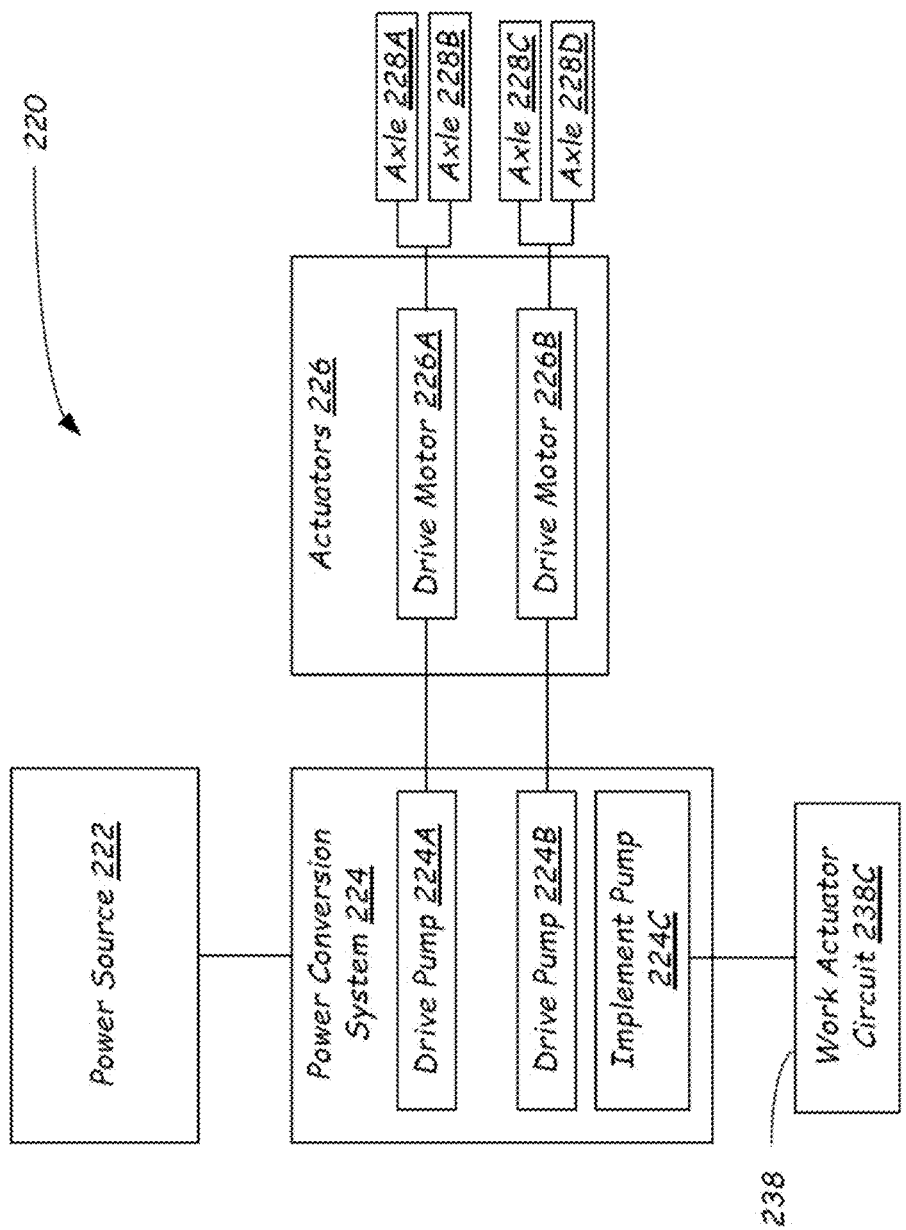
FIG. 4 is a block diagram illustrating components of a power system of a loader such as the loader illustrated in FIGS. 2-3.

The frame 210 supports and generally encloses the power system 220 so that the various components of the power system 220 are not visible in FIGS. 2-3. FIG. 4 includes, among other things, a diagram of various components of the power system 220. In the depicted example, the power system 220 includes one or more power sources 222 that are capable of generating, and/or storing power for use on various machine functions. On the power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. The power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, the power machine 200 is depicted as a skid-steer loader, and thus tractive elements on each side of the power machine are controlled together by the output of a single hydraulic pump, either through a single drive motor as in the power machine 200, or with individual drive motors. Various other configurations and combinations of hydraulic drive pumps and motors can be employed as may be advantageous.

The power conversion system 224 of the power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3-spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which implementations of the present disclosure can be practiced. While the implementations of the present disclosure can be practiced on a power machine, such as is generally described by the power machine 100 shown in the block diagram of FIG. 1 and more particularly on a loader such as track loader 200, unless otherwise noted or recited, the concepts discussed below are not intended to be limited in their application to the environments specifically described above.

In accordance with implementations of the present disclosure, power machines, such as the power machine 100 of FIG. 1, and the loader 200 of FIGS. 2-3, can include multiple functions that require both hardware, and software to be performed. That is, to execute a particular function, hardware for physically performing the function, and software for initiating and controlling the function are required. In some implementations, a power machine can be delivered (e.g. to a dealer, to a customer) with the hardware required to perform a function, but absent the requisite software.

In view of the foregoing, implementations of the present disclosure enable remote activation of one or more functions. More particularly, implementations of the present disclosure are directed to remote installation and/or uninstallation of software packages to enable execution of respective functions by the power machine. In further detail, and with non-limiting reference to the example loader 200 of FIGS. 2-3, the loader 200 can include one or more controllers. In some implementations, the controllers are used to control one or more functions, which induce actuation of various components to perform a variety of tasks. Example functions can include, without limitation, engine function, drive, loader controls (e.g., lift and tilt), attachment or implement control, and the like.

As introduced above, multiple functions can be provided for the loader 200 with only a subset of functions being enabled. For example, when the loader 200 is provisioned to a customer, less than all functions of the loader 200 can be enabled for use by the customer. In some examples, a set of functions that can be controlled by a controller on the loader 200 are optionally provided on the loader 200. The set of functions can include, without limitation, multi-speed drive motors, high flow hydraulics, ride control, and a reversing fan. To implement each of these example functions, both mechanical components, and software components are required. The loader 200 includes the mechanical components necessary to provide the functions in the set of functions. However, unless the controllers are initialized, and/or programmed to control the mechanical components to perform the functions, the functions cannot be performed. That is, for example, although the mechanical components that perform the functions might be provisioned on the loader 200, the functions cannot be performed without the controller(s) being programmed to control the mechanical components to perform the functions. In this manner, although the loader 200, including all of the mechanical components to perform the functions are provisioned to the customer, the customer cannot use the loader 200 to perform the functions absent specific programming of the controller(s). The loader 200 or other power machines, in some examples can include other functions that can be enabled through software packages that are downloadable to the controller(s). For example, engines can be programmed to set the available horsepower. The function of certain user inputs can be changed in response to software packages that are downloaded to controllers or, in some examples, the enablement of previously downloaded software packages. This includes, without limitation, on some power machines, a travel pedal that is converted from controlling a hydraulic drive pump when actuated to controlling both the drive pump and engine speed. In addition, through software package downloading and or initialization of previously downloaded software packages, allowing for different control rates on lift and/or tilt actuators. These are just some examples of functions that can be enabled through the systems and methods discussed herein.

In further detail, and as introduced above, an example function can include multi-speed drive. By way of non-limiting example, multi-speed (e.g., two-speed) drive motors can be provided as hydraulic motors with multiple displacement settings. In some examples, a low range (e.g., high displacement) provides additional torque, but a lower top speed than a high range (e.g., low displacement). In a loader, such as the loader 200, an operator can use a controller to toggle between the low range, and the high range depending on the work the operator is performing (e.g., digging, moving the loader to a new position). In some examples, a shift between ranges can be performed in response to other inputs or sensed conditions. A loader equipped with this option will have a user input, two-speed motors, and associated wiring and other incidental components. However, if the controller is not programmed to enable shifting between ranges, the motors will remain in a single range (e.g., low) at all times.

In some implementations, high-flow hydraulics can be provided, and is related to the amount of hydraulic flow provided to an implement. In some examples, an open center, series control valve is provided, which receives pressurized fluid from an implement pump, and provides hydraulic fluid to the implement. For example, the control valve can provide hydraulic fluid to lift cylinder(s) for a lift arm, tilt cylinder(s) for a tilt mechanism, and then to the implement. In some examples, the implement pump is separate from drive pumps that are provided to the drive circuits. Because some implements require higher flow than what would be provided to the lift and tilt cylinders, a separate, high flow pump can be included that can selectively provide additional flow to the implement. This can occur, for example, when a user input is engaged (e.g., the user controls the high flow), or if an attachment controller communicates a request for high flow to a machine controller. A loader with this option will have a user input, a high flow pump, and associated hydraulic circuitry to provide additional flow out of couplers that can be attached to hydraulic lines on an implement. However, if the controller is not programmed to enable high-flow, this function cannot be used.

Another example function includes ride control. In some examples, ride control enables the lift arm to act as a suspension for a loader. In some examples, a loader does not include a suspension system. Instead, the axles are rigidly mounted to the frame. Ride control enables the lift arm to move freely (e.g., up, down) un-commanded as the loader is moving over the ground. This movement of the lift arm provides some smoothing of a ride, as the lift arm absorbs some of the shock imparted to the machine as it moves over rough terrain.

In further detail, and with reference to FIG. 1, as the power machine 100 travels over terrain under the influence of the tractive elements 140, bumps in the terrain give rise to vibrations and shock (collectively, "impact loads") to the frame 110. Other impact loads can be imparted to the frame 110 through movement of attached work implements, or the lift arms themselves even when the machine is stationary (i.e. not traveling). The impact loads can propagate throughout the power machine 100 and into the operator station 150, causing discomfort to the operator in the operator station 150. Ride control is described in further detail in commonly assigned, WO 2016176547 A1, the disclosure of which is expressly incorporated herein by reference for all purposes.

Figure 5:
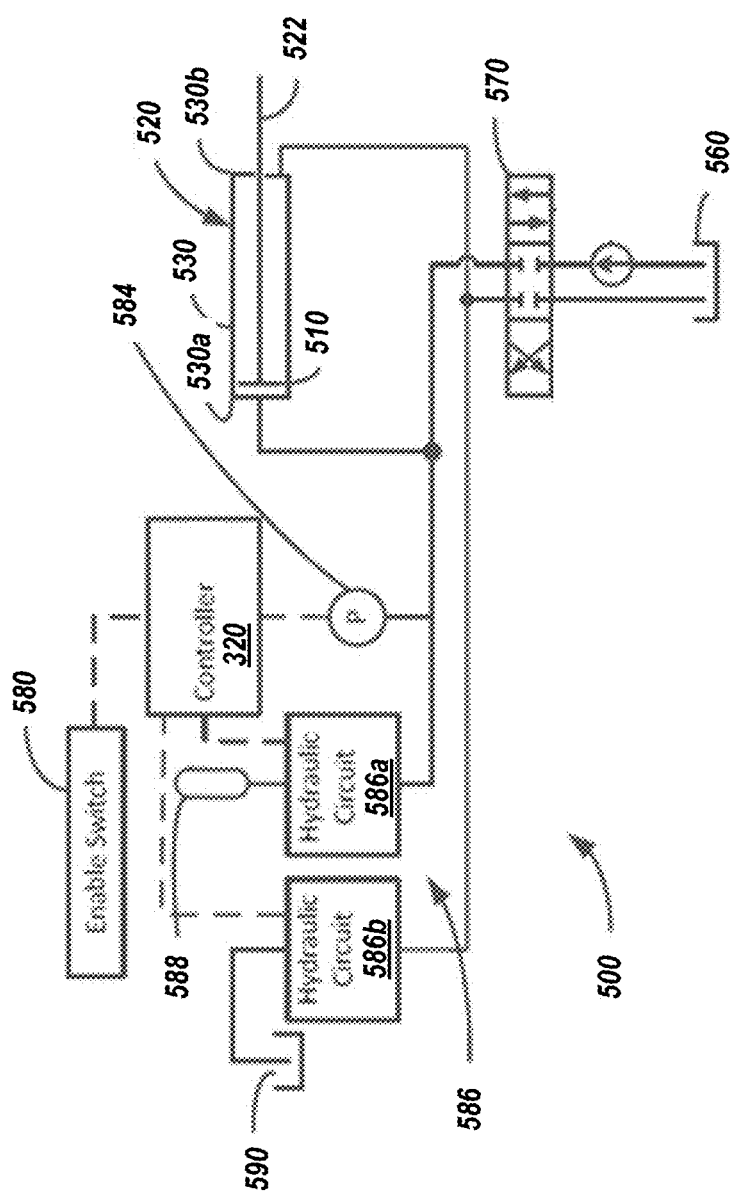
FIG. 5 is a block diagram of an example lift arm control system.

With reference to FIG. 5, an example lift arm control system 500 includes a hydraulic actuator 520 that can be used to control movement of a lift arm. Extension and retraction of the hydraulic actuator 520 causes the lift arm to pivot about joints. In the depicted example, the lift arm control system 500 further includes a reservoir 560, a pump 565, and a lift control valve 570. The hydraulic actuator 520 includes a cylinder body 230 having a base end 530a and a rod end 530b. The cylinder body 530 houses a piston 510 that is moveable with the cylinder body 530. A rod 522 is attached to the piston 510 and extends from the rod end 530b of the cylinder body 530. The piston 510 moves within the cylinder body 530 to linearly move the rod 520 along its axis so that it can extend from and retract into the cylinder body 530.

In use for ride control, the piston 510 and the rod 522 to move within the cylinder body 530 so that the lift arm can move up and down in reaction to impact loads. The lift arm movement gives rise to reactive loads that oppose the impact loads to cancel or dampen the impact loads and improve operator comfort. The lift arm control system 500 includes an enable switch 580 (e.g., physical switch/dial, GUI on a display), a controller 582, a pressure sensor 584, a ride control hydraulic circuit 586, an accumulator 588, or other suitable storage device capable of storing pressurized hydraulic fluid, and a reservoir 590. The enable switch 580 is a manual operator switch preferably located in the operator station 150. When the operator wishes to turn ride control functionality on or off, the operator manually adjusts the enable switch 580 to "enable" and "disable" positions, respectively. The controller 582 may be a dedicated controller for the ride control system, or may be part of the overall control system 160 of the power machine 100 described above. The pressure sensor 584 senses the pressure of hydraulic fluid communicating with the one end, in this example where extension of the actuator causes the lift arm to be raised, the base end 530a of the cylinder body 530. The controller 582 takes as inputs the "enable" or "disable" signal from the enable switch 580, and a pressure signal from the pressure sensor 584. The input signals may be electronic signals or signals of another kind (e.g., pressure signals or mechanical signals) suitable for a particular application. An enable signal from the enable switch 580 turns on the ride control system. When the ride control system is turned on, signals from the controller 582 selectively actuate the ride control feature by activating and de-activating the ride control hydraulic circuit 586. When the ride control hydraulic circuit 586 is activated, the hydraulic actuator 520 is placed in fluid communication with the accumulator 588 and the reservoir 590. When the ride control hydraulic circuit 586 is de-activated, the actuator 520 is not in fluid communication with the accumulator 588 and reservoir 590.

The ride control hydraulic circuit 586 of FIG. 5 includes a first hydraulic circuit 586a, which acts like a switch between the accumulator 588 and the actuator 520, and a second hydraulic circuit 586b, which acts like a switch between the reservoir 590 and the actuator 520. The hydraulic circuits 586a, 586b can be any configuration that selectively allows flow therethrough, including a two-position, two-way valve, which allows flow in one position and blocks flow in the other position. Any number of different hydraulic circuits can be employed. The base-side hydraulic circuit 586a opens and closes communication between the base end 530a of the cylinder 530 and the accumulator 588, and the rod-side hydraulic circuit 586b opens and closes communication between the rod end 530b and the reservoir 590. For ride control to be on, both the first hydraulic circuit 586a and the second hydraulic circuit 586b must be activated. Consequently, the ride control hydraulic circuit 586 can take a single input from the controller 582 to simultaneously activate circuits 586a, 586b. The reservoir 590 can be a dedicated tank or can communicate with or be part of another reservoir (e.g., the reservoir 560).

When the ride control feature is active, impact loads that are introduced to the power machine 100 will cause the lift arm to move up and down, and hydraulic fluid is displaced between the base end 530a and the accumulator 588 through the base-side hydraulic circuit 586a. Simultaneously, hydraulic fluid is displaced between the reservoir 590 and the rod side 530b through the rod-side hydraulic circuit 586b. When hydraulic fluid is forced into the accumulator 588 as the rod 522 retracts into the cylinder body 530, pressure increases in the accumulator 588. As forces on the rod 522 and pressure in the accumulator 588 change, the accumulator 588 is able to force hydraulic fluid back into the base end 530a. The pressure sensor 584 measures the pressure at the base end 530a of the cylinder body 530. The pressure reading is an indication of the load on the lift arm, which may indicate whether the lift arm is raised above a lowest position (i.e. off of mechanical stops), or whether the lift arm has been lowered. It may also indicate whether a large load is being carried by an implement (e.g., a bucket).

In accordance with implementations of the present disclosure, the control system (e.g., the controller 582) can be selectively programmed to activate and de-activate the ride control function. In some examples, the loader is provisioned to a customer without the control system being programmed to enable the ride control function. Consequently, and although the requisite mechanical components are provided (e.g., the enable switch 580, the pressure sensor 584, the hydraulic circuit 586, the accumulator 588, the reservoir 590), the ride control function cannot be executed (e.g., the operator can activate the enable switch 580, but nothing with respect to ride control occurs). However, if the control system is programmed for the ride control function, the ride control function can be selectively enabled by the operator.

Another example function includes activation of a reversing fan. The reversing fan can be described as a cooling fan on the loader. In some examples, the reversing fan draws air through one or more heat exchangers (e.g., oil cooler and radiator), and pushes the air through the engine compartment. In some examples, the heat exchangers are mounted horizontally above the engine. In response to an input from an operator, the fan can change directions to blow air through the heat exchangers (instead of drawing it through them). This enables the fan to blow debris that may have accumulated on or in the heat exchangers. In some examples, a valve is provided to control the direction of the fan motor (e.g., provided as a hydraulic motor), and an enable switch (e.g., physical switch/dial, GUI on a display) is provided that the user can use to control the direction.

Although multiple example functions have been described herein, it is contemplated that implementations of the present disclosure can be realized with any appropriate functions that can be provisioned on a power machine, such as a loader.

In accordance with implementations of the present disclosure, the control system can be selectively programmed to activate and de-activate the reversing fan function. In some examples, the loader is provisioned to a customer without the control system being programmed to enable the reversing fan function. Consequently, and although the requisite mechanical components are provided (e.g., the enable switch, the valve), the reversing fan function cannot be executed (e.g., the operator can activate the enable switch, but nothing with respect to ride control occurs). However, if the control system is programmed for the reversing fan function, the reversing fan function can be selectively enabled by the operator.

In view of the foregoing, implementations of the present disclosure are directed to initialization systems that provide the ability for selective enabling or disabling of one or more functions of a power machine. For example, instead of having the control system programmed to enable all functions in the set of functions at a factory (e.g., where the power machine is made), the functions can be selectively enabled (or disabled) downstream (e.g., at a dealer, at an owner, at an operator). That is, one or more of the functions can be selectively enabled, or disabled in the field. The process of enabling (or disabling) software functions, in some examples, includes downloading a software package (or deleting a software package) and potentially initializing (or uninitializing) the software package so that its functionality is included into (or excluded from) the control system operation.

In some implementations, a computing device is provided that communicates with the control system of the power machine. In some examples, a user uses the computing device to communicate with one or more controllers of the power machine. For example, the computing device can communicate with a control system (e.g., the control system 160 of FIG. 1), and/or a function-specific controller (e.g., the controller 582 of FIG. 5). In some examples, the power machine includes a controller area network (CAN) bus or other appropriate communication link that enables two or more controllers of the power machine to communicate with one another. In some examples, the computing device is able to interface with the CAN bus to communicate with the one or more controllers through the CAN bus. While the power machine, in some examples, may include more than one controller that will communicate with the computing device, for simplicity's sake, the one or more controllers will be referred to as a "machine controller" hereinafter.

In some examples, communication between the computing device and the machine controller is provided as a wired connection. For example, the power machine can include a plug for receiving a cable that enables electrical communication between the machine controller and the computing device. In some examples, communication between the computing device, and the machine controller is provided as a wireless connection. For example, the power machine can include one or more components (e.g., Wifi transceiver, Bluetooth transceiver, near-field communication (NFC) transceiver) that enables communication with the computing device.

In some examples, the computing device can communicate with the machine controller over the Internet. For example, machine controller can be connected to the Internet (e.g., wired connection to a router using a local area network (LAN) cable, wifi connection to a router), and the computing device can transmit requests to, and receive responses from the machine controller (e.g., through a hypertext transfer protocol (HTTP)). As another example, the machine controller can communicate directly with the computing device over a wireless connection (e.g., Bluetooth, NFC) avoiding intermediate devices (e.g., routers, gateways, servers).

In some implementations, the user can interact with the computing device to send requests to, and receive responses from, the machine controller. In some implementations, the user can interact with the computing device to download software packages to, and/or delete software packages from the controller(s). For example, the user can use the computing device to instruct a controller to install a software package or initialize an already installed software package to enable functions. In some examples, the software package corresponds to one or more functions and can be executed by the machine controller to enable use of the one or more functions on the power machine. In some examples, the software package is stored on the computing device, and is downloaded to the controller(s) from the computing device. In some examples, the software package is stored in a remote data store (e.g., a server), and is retrieved from the remote data store. For example, the computing device can instruct the remote data store to download the software package to the machine controller or can instruct the controller(s) to retrieve the software package from the remote data store. In yet other examples, software packages can be resident on the machine controller but may be uninitialized so that the software packages are inoperable. In these examples, no downloading of software packages is necessary to enable a function, except for data that may be used to initialize (or uninitialize) software packages already resident on the machine controller.

In some implementations, the machine controller can be configured to enable functions through interfaces integral to the power machine. For example, the power machine can include a display panel, which can display one or more interfaces that can be used to direct installation, (or uninstallation) and/or initialization (or uninitialization) of software packages. In some examples, a software package that is to be installed on a controller can be retrieved from a remote data store. For example, in response to user instructions through the interface, the software package can be retrieved from the remote data store by a controller of the power machine (e.g., over an Internet connection). In some examples, a software package that is to be installed on a controller can be provided from local storage. For example, a local storage device (e.g., USB stick, SD card, computing device) can have the software package stored thereon, and can interface with the power machine (e.g., be plugged into a USB port, or SD card slot), and the software package can be retrieved therefrom.

In some implementations, the machine controller requests permission before receiving and installing, and/or initializing a software package. For example, in response to user instructions to install/uninstall and/or initializing/uninitializing a software package, the machine controller can request permission from a remote server. In some examples, the request can include an identifier of the power machine (e.g., a unique identifier identifying the power machine), an identifier of the software package (e.g., a unique identifier identifying the software package, a filename and/or version of the software package) to be downloaded and/or initialized, and one or more credentials of the user (e.g., username, password, PIN, or an identifier from a tool that may be coupled to the controller for the purposes of enabling a software package on the machine controller). In some examples, the remote server can process data included in the request to determine whether to grant or deny permission. For example, the remote server can compare the credentials of the user to know credentials, and determine whether the user is authentic, and/or whether the user is permitted to install/uninstall software packages to power machines, generally, and/or to the particular power machine. In some examples, if permission is denied, an alert can be provided back to the user. In some examples, if permission is granted, the software package can be enabled on the machine controller. In some examples, the software package can be enabled on the machine controller by providing an initialization indicator from the remote server to the machine controller. The initialization indicator, in some examples, is an indication such as an on/off bit of information. In some examples, the initialization indicator can be more complex, such as a software key that the machine controller can recognize as coming from a legitimate source. The initialization indicator is then stored on the machine controller to signify that the software package is initialized.

In some implementations, after the software package has been enabled or disabled on the machine controller, a central registry can be updated to record the activity. In some implementations, the central registry includes an inventory of power machines (e.g., indexed by unique identifier), and, for each power machine, maintains a list of functions that are enabled, or not enabled on the respective power machine. In some examples, the central registry maintains a history of function enablement/disablement (e.g., a history of software package installations, uninstallations, initializations, and/or un-initializations for each power machine), which can include, among other information, the user performing the enablement or disablement, and the time and date of the enablement or disablement.

In some implementations, enablement of a software package can be temporary. In some examples, the software package can be enabled, and the respective function enabled for a period of time, and then disabled. For example, an operator of the power machine can have the software package installed on the power machine to enable a respective function. After a period of time (e.g., hours, days, weeks, months, years), the operator can determine that the function is no longer needed. Consequently, the operator can have the software package uninstalled from the power machine, and the function disabled. In some examples, the period of time can be a predetermined period of time. For example, the power machine can have the software package installed on the power machine to enable a respective function, and the installation can be associated with a period of time (e.g., hours, days, weeks, months, years) or an amount of operation time on the machine (e.g., for a certain number of hours of machine operation). After expiration of the associated period of time, the software package is disabled. Subsequently, if desired, the feature can be enabled using this same process.

In some implementations, disablement of the software package is automatic. For example, it can be determined that the period of time has expired, and in response, the controller can be triggered to uninstall or disable the software package. In some examples, the machine controller can determine that the period of time has expired and can automatically uninstall or disable the software package. In some examples, a central service (e.g., a server referencing the central registry) can determine that the period of time has expired, and can interact with the machine controller (e.g., over an Internet connection) to disable the software package (e.g., instruct the controller to uninstall the software package).

In some implementations, after the software package has been enabled on the machine controller, the corresponding function(s) can be used by an operator. For example, a power machine can be delivered (e.g., sent to a dealer from a factory, sold to a customer, or otherwise be made available in the field) absent a software package for the ride control function. Post-delivery, it can be determined that one or more functions are desired.

By way of a first non-limiting example, a customer can seek to purchase a power machine from a dealer but request a demonstration of the ride control function. In response, the dealer can enable the ride control function, as described herein. That is, for example, the dealer can use a computing device to have a software package corresponding to the ride control function enabled on the power machine. The customer can test the power machine with the ride control function. If the customer determines that they would like to purchase the power machine with the ride control, the software package can remain enabled on the power machine. If the customer determine that they would not like the ride control function, the software package can be disabled before delivery to the customer.

By way of a second non-limiting example, a customer can seek to rent a power machine from an operator. The customer can request both the ride control function, and the multi-speed motor function. In response, the operator can enable the ride control function, and the multi-speed motor function, as described herein. That is, for example, the dealer can use a computing device to have one or more software packages corresponding to the ride control function, and the multi-speed motor function enabled on the power machine. The customer can use the power machine with the ride control function, and the multi-speed motor function over the course of the rental. Upon expiration of a rental period (e.g., predetermined rental time expiring, power machine returned to operator), the software package(s) can be disabled from the power machine.

By way of a third non-limiting example, an owner of a power machine can have purchased the power machine absent one or more functions (e.g., absent the ride control function, and the multi-speed motor function). The owner can request both the ride control function, and the multi-speed motor function. For example, the owner can request the functions through the dealership, where the owner purchased the power machine, or directly form the manufacturer of the power machine. In response, the ride control function, and the multi-speed motor function can each be enabled, as described herein. That is, for example, a user (e.g., the dealer, the owner) can use a computing device to have one or more software packages corresponding to the ride control function, and the multi-speed motor function enabled on the power machine.

Figure 6:
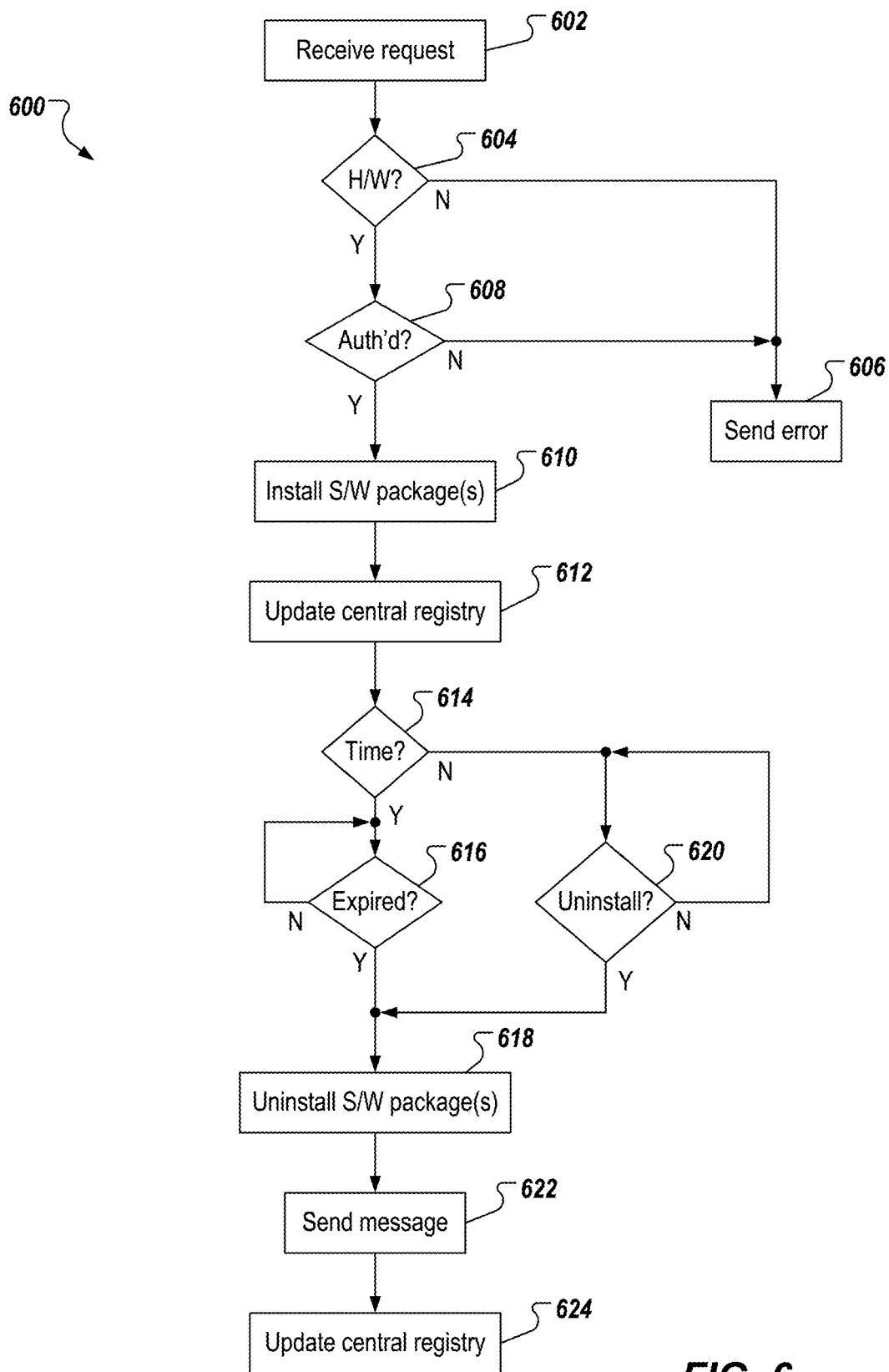
FIG. 6 depicts an example process that can be executed in accordance with implementations of the present disclosure.

FIG. 6 depicts an example process 600 that can be executed in accordance with implementations of the present disclosure. In some examples, the example process 600 is executed as one or more computer-executable programs executed by one or more computing devices. In some examples, at least a portion of the example process 600 is executed by a computing device operated by a user. In some examples, at least a portion of the example process 600 is executed by one or more servers.

A request is received (602). For example, a request to enable one or more functions can be received. In some examples, a controller of a power machine requests permission before enabling or disabling a software package. For example, in response to user instructions to enable a software package, the power machine (e.g., the control system) can request permission from a remote server. In some examples, the request can include an identifier of the power machine (e.g., a unique identifier identifying the power machine), an identifier of the software package (e.g., a unique identifier identifying the software package, a filename and/or version of the software package), and one or more credentials of the user (e.g., username, password, PIN). It is determined whether the requisite hardware is available (604). In some examples, to execute a function, appropriate hardware is required. If the particular power machine does not include the requisite hardware, the function cannot be performed, and the software package(s) need not be enabled. In some examples, the identifier of the power machine can be used to index a list of available hardware on the power machine, and determined whether the requisite hardware for the associated function is provided on the power machine. If the requisite hardware is not available, an error message can be sent (606). For example, a message can be provided to the user that submitted the request, indicating that the requisite hardware is not available.

If the requisite hardware is available, it is determined whether activation of the function(s) is authorized (608). In some examples, the remote server that received the request can process the credentials to authenticate the user that submitted the request, and, if authenticated, determine whether the user is permissioned to install software packages on the power machine. If enablement of the function(s) is not authorized, an error message can be sent (606). For example, if it is determined that the user is not authenticated, or is not permitted to have software packages installed, the error message can be sent. If activation of the function(s) is authorized, one or more software packages are installed on one or more controllers of the power machine (610). In some examples, installation of the one or more software packages includes download of the software package(s) to the power machine, and execution of an installer to install the software package(s) on the controller(s). A central registry is updated (612). For example, the central registry can be updated to record installation of the particular software package(s) (e.g., type, time, date).

It is determined whether activation of the function(s) is time dependent (614). For example, and as described herein, a function can be provided for a predetermined period of time. If enablement of the function(s) is time dependent, it is determined whether the period of time has expired (616). For example, it can be determined whether a current time exceeds the predetermined period of time. If the period of time has not expired, the example process 600 loops back. If the period of time has expired, the software package(s) is/are disabled. For example, an uninstall program is executed to uninstall the software package(s) from the controller(s).

If activation of the function(s) is not time dependent, it is determined whether the software package(s) is/are to be disabled (620). For example, a user of the power machine can later determine that they no longer want the one or more functions and can request that the corresponding software packages be disabled. If the software package(s) is/are to be disabled, the software package(s) is/are disabled (618). Otherwise, the example process 600 loops back.

A message is sent (622). For example, a confirmation message can be sent to a user either performing the disablement, or an owner/operator of the power machine indicating that the software package(s) has/have been disabled. The central registry is updated (624). For example, the central registry can be updated to record disablement of the particular software package(s) (e.g., type, time, date).

Several implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. An initialization system for a power machine having hardware physically capable of executing at least one function, comprising:
a communication link capable of establishing communication with a remote system; and a machine controller having a non-volatile memory storing a software package with instructions that, when executed, can enable hardware of the power machine to perform at least one function, the software package being installed and uninitialized, and the machine controller being operable to:
receive a first request from an attachment controller of an implement that is removably attachable to the power machine, and
responsive to the first request, execute the at least one function to enable operation of the implement, the software package having been initialized in response to an initialization indicator received from the remote system, such that the instructions of the software package are executable to execute the at least one function.

2. The initialization system of claim 1, wherein the hardware comprises an implement pump that is operable to provide hydraulic fluid to the implement.

3. The initialization system of claim 2, wherein the implement pump is a high flow pump and the at least one function comprises providing a high-flow of hydraulic fluid to the implement.

4. The initialization system of claim 1, wherein the initialization indicator is received in response to a second request sent from the machine controller to the remote system.

5. The initialization system of claim 4, wherein the second request is sent from the machine controller to the remote system after the first request is received by the machine controller.

6. The initialization system of claim 4, wherein the first request is received by the machine controller after the second request is sent from the machine controller to the remote system.

7. The initialization system of claim 4, wherein the second request comprises one or more of an identifier of the power machine, an identifier of the software package, and one or more credentials of a user.

8. The initialization system of claim 1, wherein the machine controller subsequently disables the software package.

9. The initialization system of claim 8, wherein disabling the software package is executed in response to one of expiration of a period of time and a user request.

10. The initialization system of claim 1, wherein at least a portion of the communication link is removably attached to the power machine.

11. An initialization system for a power machine having hardware physically capable of executing at least one function, comprising:
 a data-bus link capable of establishing communication with an external computing system; and
 a machine controller having a non-volatile memory storing a software package with instructions that, when executed, can enable hardware of the power machine to perform at least one function, the software package being installed and uninitialized, and the machine controller being operable to:
 receive a first request, and
 responsive to the first request, execute the at least one function to enable operation of an implement, the software package having been initialized in response to an initialization indicator communicated over the data-bus link, such that the instructions of the software package are executable to execute the at least one function.

12. The initialization system of claim 11, wherein the data-bus link is a Control Area Network (CAN) bus.

13. The initialization system of claim 11, wherein the hardware comprises an implement pump that is operable to provide hydraulic fluid to the implement.

14. The initialization system of claim 13, wherein the implement pump is a high flow pump and the at least one function comprises providing a high-flow of hydraulic fluid to the implement.

15. The initialization system of claim 11, wherein the initialization indicator is communicated in response to a second request communicated over the data-bus link.

16. The initialization system of claim 15, wherein the second request is sent from the machine controller after the first request is communicated over the data-bus link.

17. The initialization system of claim 15, wherein the first request is received by the machine controller after the second request is communicated over the data-bus link.

18. The initialization system of claim 15, wherein the second request comprises one or more of an identifier of the power machine, an identifier of the software package, and one or more credentials of a user.

19. The initialization system of claim 11, wherein the machine controller subsequently disables the software package.

20. The initialization system of claim 19, wherein disabling the software package is executed in response to one of expiration of a period of time and a user request.

* * * * *